United States Patent [19]

Matsuda

[11] Patent Number: 4,858,013
[45] Date of Patent: Aug. 15, 1989

[54] SOLID STATE IMAGING DEVICE WITH ADAPTIVE PIXEL CORRECTION

[75] Inventor: Hikaru Matsuda, Kanagawa, Japan

[73] Assignee: Mitsubishi Denki Kabushiki Kaisha, Tokyo, Japan

[21] Appl. No.: 199,161

[22] Filed: May 26, 1988

Related U.S. Application Data

[63] Continuation-in-part of Ser. No. 169,411, Mar. 17, 1988.

[51] Int. Cl.$^4$ .................. H04N 3/15; H04N 5/217
[52] U.S. Cl. ............................ 358/213.17; 358/163; 358/167
[58] Field of Search ............ 358/163, 167, 213.15, 358/213.18, 213.17

[56] References Cited

U.S. PATENT DOCUMENTS

| 3,902,011 | 8/1975 | Pieters et al. | 358/163 |
|---|---|---|---|
| 4,189,751 | 2/1980 | Nagumo | 358/213.17 |
| 4,234,890 | 11/1980 | Astle et al. | 358/163 |
| 4,470,065 | 9/1984 | Reitmeier | 358/163 |
| 4,473,845 | 9/1984 | Davy | 358/163 |
| 4,500,911 | 2/1985 | Ninomiya et al. | 358/167 |
| 4,517,600 | 5/1985 | Reitmeier | 358/163 |
| 4,590,520 | 5/1986 | Frame et al. | 358/163 |
| 4,600,946 | 7/1986 | Levine | 358/163 |
| 4,623,923 | 11/1986 | Orbach | 358/163 |
| 4,654,714 | 3/1987 | Hurst, Jr. et al. | 358/213.17 |
| 4,701,784 | 10/1987 | Matsuoka et al. | 358/213.17 |
| 4,739,495 | 4/1988 | Levine | 358/213.15 |

Primary Examiner—Jin F. Ng
Assistant Examiner—Stephen Brinich
Attorney, Agent, or Firm—Wolf, Greenfield & Sacks

[57] ABSTRACT

A solid state imaging device is disclosed which includes a solid state sensor for converting an external scene into electrical signals, an A/D converter for converting output signals from the solid state sensor into digital signals, a frame memory for storing offset signals of the solid state sensor, and an arithmetic unit for subtracting the offset signals stored in the frame memory from the digital signals of the A/D converter. The signals from the arithmetic unit are output through a D/A converter and a synchronization adding circuit. In the thus constituted solid state imaging device, a judgement as to the level of the offset signal from the frame memory is made. If this level is outside a predetermined range, it is judged that there is a defective pixel. Interpolation is then effected with neighboring pixel signals in a spatial processor.

33 Claims, 33 Drawing Sheets

A SCANNING LINE

SOLID STATE IMAGING DEVICE WITH ADAPTIVE PIXEL CORRECTION

RELATED APPLICATION

This application is a continuation-in-part of application Ser. No. 169,411, filed Mar. 17, 1988.

BACKGROUND OF THE INVENTION

1. Field of the Invention

The present invention relates to a solid state imaging device which utilizes a solid state sensor having a substantial number of pixels (picture elements).

2. Description of the Prior Art

FIG. 2 illustrates a block diagram of an example of a prior art solid state imaging device. In FIG. 2, the reference numeral 1 designates a solid state sensor for imaging an external scene; 2 denotes an A/D converter for converting analog image output signals of the solid state sensor 1 into digital signals; 3 represents a frame memory for storing offset signals of the solid state sensor; 4 denotes an arithmetic unit for subtracting the offset signals of the frame memory 3 from the output digital signals of the A/D converter 2 during a normal operation; and 5 stands for a D/A converter/synchronization circuit for converting the outputs of the arithmetic unit 4 into analog video signals and for adding the synchronizing signals.

Next, attention will be focused on the operation of the prior device. The incident light beams OP are converted into analog image signals by means of the solid state sensor 1, and the analog image signals are further converted into digital image signals by use of the A/D converter 2. The outputs of the A/D converter 2 with respect to the uniform light beams incident upon the entire picture are stored as offset signals in the frame memory 3. The arithmetic unit serves to subtract the offset signals stored in the frame memory 3 from the outputs of the A/D converter 2 with respect to an object to be imaged during working time, thereby obtaining corrected outputs. The corrected outputs are transmitted to the D/A converter/synchronization adding circuit 5 which effects conversion into analog signals and multiplexing of synchronizing signals. The above-described control is performed by a timing generator 6 for creating a specific timing, in which case a clock for driving the solid state sensor is defined as the reference. Japanese Patent Published Disclosure No. 36987/87 discloses such a solid state imaging device.

There are, however, some inherent problems with the thus constructed conventional device. In the case of an image which is so defective that a certain pixel of the solid state sensor 1 is completely dead or insensitive even if the incident light beam emerges, the output of this pixel does not vary or varies only a little, and it follows that spots unfavourably appear on the picture as shown in FIG. 3. This phenomenon is an obstacle to obtaining high-quality images.

Moreover, where the above-described conventional device is employed in searching for a small body, it is likely that a mistaken target may be assumed to be the small body of interest. As a result, a solid state sensor having no defect of the kind described is required, and this demand will inevitably lead to an increase in the overall cost of a device produced to meet this demand.

SUMMARY OF THE INVENTION

It is a primary object of the present invention to provide a solid state imaging device which overcomes the above-mentioned obstacles or problems and is capable of outputting high-quality image signals even if there are defective pixels in a solid state sensor.

This and other objects are achieved by a solid state imaging device including a level detector connected to an output of the frame memory, means for detecting defective picture elements, and spatial arithmetic means for defining compensation signals by utilizing image signals associated with neighbouring pixels and for substituting the compensation signals as image signals in a position corresponding to the defective picture elements.

Other features and advantages of the invention will become apparent from the following description taken in connection with the accompanying drawings.

DESCRIPTION OF THE PREFERRED EMBODIMENT

Figure 1:
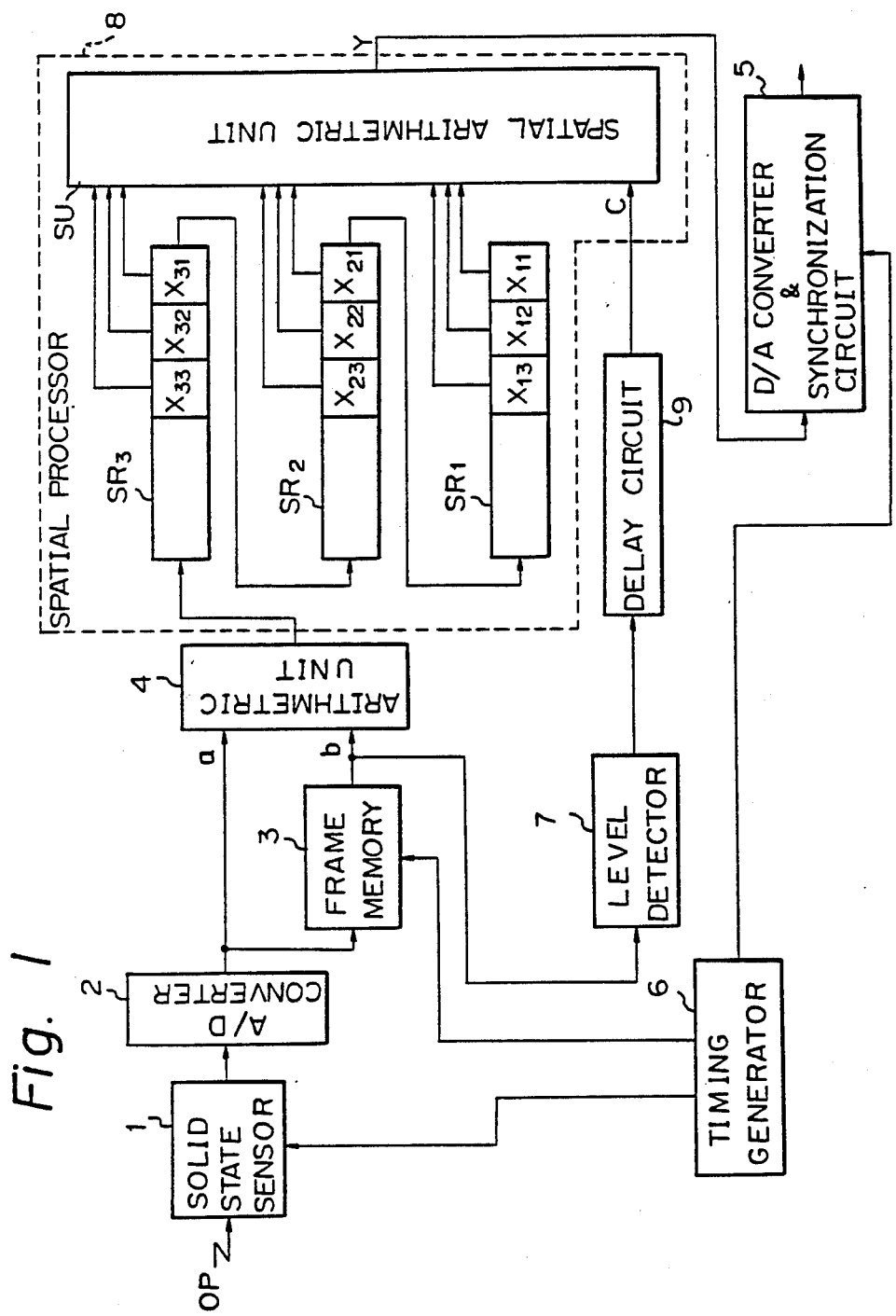
FIG. 1 is a block diagram of a solid state imaging device, illustrating one embodiment of the present invention.
Figure 2:
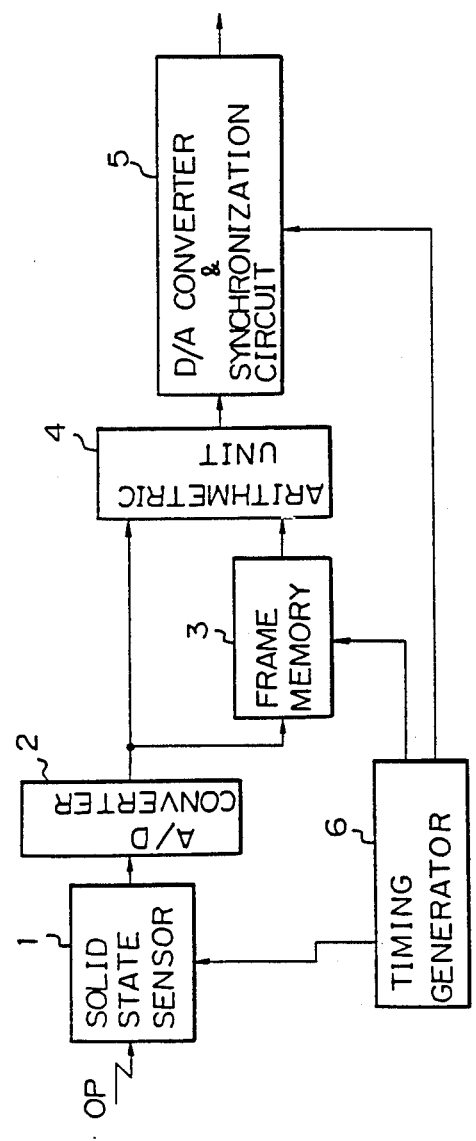
FIG. 2 is a block diagram showing one example of a prior art solid state imaging device.
Figure 3:
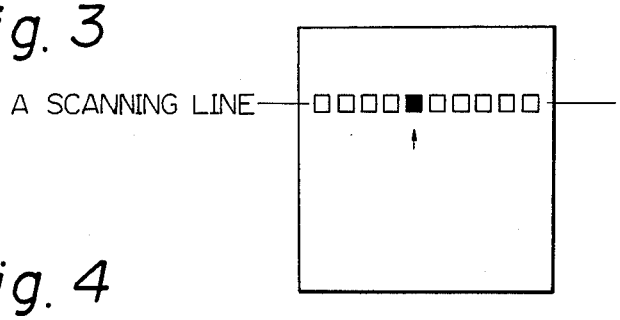
FIG. 3 is a conceptual display of a screen which is produced from a solid state sensor having a defective pixel.

Referring first to FIG. 1, a block diagram of one embodiment of the present invention is shown. In the figure, components which are the same as those depicted in FIG. 2 are marked with the same symbols. A level detector, more precisely a digital level comparator generally indicated at 7, serves to judge each level of offset signals stored in a frame memory 3. The capacity of the frame memory may be determined, in accordance with the pixel number on a picture. The offset signals are obtained through the receipt of uniform light beams from uniform object by the solid state sensor and are stored in the frame memory, which is the same means as that employed in the prior art solid state imaging device. The numeral 8 represents a spatial processor composed of shift registers SR1 through SR3 and a spatial arithmetic circuit SU. The circuit SU, as is well known, controls parallel-simultaneous operation of the output signals from the shift registers SR1 through SR3 in which raster format scanned serial signals are converted into parallel-simultaneous signals. The capacity of each shift registers SR1 through SR3 corresponds to the pixel number on a horizontal scan line. The numeral 9 designates a delay circuit for adjusting a given timing by delaying signals of the level detector 7.

Figure 4:
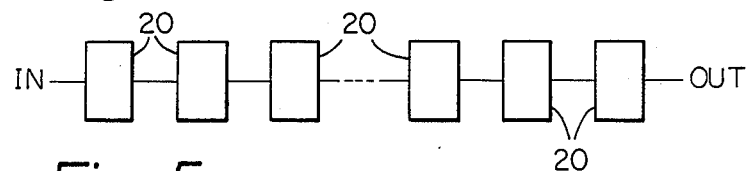
FIG. 4 is a block diagram showing one example of a delay circuit.

The delay circuit 9 has shift registers 20 coupled in series as illustrated in FIG. 4. The delay time of the circuit 9 is settled as the total delay time of the circuit 9 and said level detector 7 is equal to the total delay time of said arithmetic unit 4 and said shift registers in the spatial processor 8, as the delay circuit 9 can delay the output of said level detector 7 which corresponds to a certain pixel until the signals of that certain pixel and the adjacent pixels are output.

Figure 5:
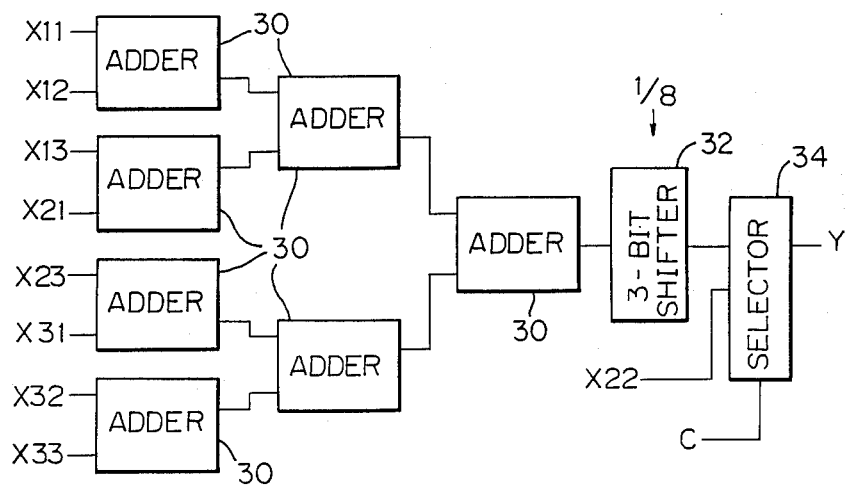
FIG. 5 is a typical block diagram of a spatial arithmetic unit suited for the present invention.

A spatial arithmetic unit suitable for this invention has seven adders 30, a 3-bit shifter 32 for dividing by 8 and a selector 34 that is controlled by the signal from said delay circuit 9, all as shown in FIG. 5. The spatial arithmetic unit receives nine signals from said shift registers SR1 through SR3 and a signal from said level detector 7 through said delay circuit 9.

In the thus constructed solid state imaging device, each level of the images is held by the frame memory 3, and the defective images are detected by the level detector 7 which judges the severity of the defect from the level thereof. The defective images detected are caused to be replaced by compensation signals of neighbouring peripheral pixels by means of the spatial processor 8.

An explanation will next be given relating the following formulae to FIG. 1.

Let the content stored in the frame memory 3 be b, and let the judging threshold value of the level detector 7 be $\epsilon$. Based on the relationship of magnitude between the content b and the threshold value $\epsilon$, the output C of a delay circuit 9 will be generated after a predetermined delay:

$$C=1, (\text{when } b \geq \epsilon) \quad (1)$$

$$C=0, (\text{when } b < \epsilon) \quad (2)$$

The spatial processor 8 executes processing as follows: signals of eight neighbouring pixels in regard to a certain pixel X22 are fetched from part of shift registers SR1, SR2 and SR3, each having a delay time corresponding to a scanning line of the image; and spatial arithmetic is effected under the condition of the formula (1), while the signal of the pixel X22 is output under the condition of the formula (2).

To formulate the output of the spatial arithmetic unit SU shown in FIG. 5 in spatial processor 8, let this output be Y, let the signal corresponding to the pixel X22 be x22, and similarly let the eight neighbouring signals corresponding to X11, X12, X13, X21, X23, X31, X32 and X33 of FIG. 1 be x11, x12, x13, x21, x23, x31, x32 and x33, respectively. The output Y is expressed as:

$$Y = \tfrac{1}{8}(x11+x12+x13+x21+x23+x31+x32+x33), (\text{when } C=1) \quad (3)$$

$$Y = x22, (\text{when } C=0) \quad (4)$$

Hence, at the pixel which has been judged to be defective, an average value for the eight neighbouring pixels is identified as a substitute signal. If there is no defect, the original signal is output as it is.

The above-described embodiment, as indicated by the formula (3), utilizes eight neighbouring pixels. However, the same effects can obviously be attained by performing the following processing which involves the use of four neighbouring pixels or four different neighbouring pixels. Namely, the formulae (5) and (6) which may substitute for the formula (3) are as follows:

$$Y = \tfrac{1}{4}(x12+x21+x23+x32), (\text{when } C=1) \quad (5)$$

$$Y = \tfrac{1}{4}(x11+x13+x31+x33), (\text{when } C=1) \quad (6)$$

In this case, the spatial arithmetic unit SU is composed of three adders, a 2-bit shifter and a selector, and five output terminals of the shift registers SR1 through SR3 are coupled to this spatial arithmetic unit.

Figure 6:
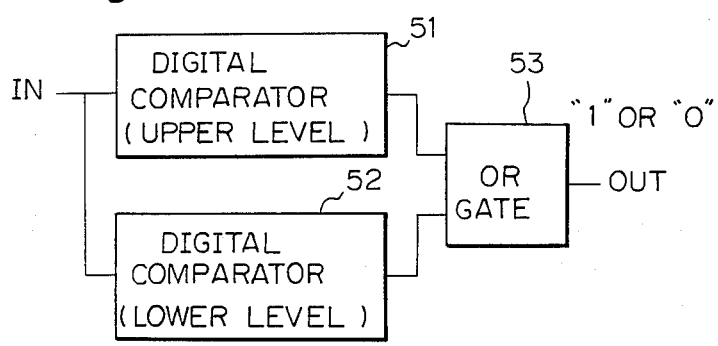
FIG. 6 is a block diagram showing one example of a level detector.

In the above embodiment of the present invention, a defective pixel is as one in which the signal level is lower than the predetermined level of the digital comparator; however, a defective pixel may also be defined as one in which the signal level is not between a predetermined lower level and a predetermined upper level. In this case, a level detector having an upper level digital comparator 51, a lower level digital comparator 52 and an OR gate 53, as shown in FIG. 6, is used. The output signal of this detector (in FIG. 6) will be "0" if the input signal level of the detector is between a lower level set in the comparator 52 and an upper level set in the comparator 51, while the output signal will be "1" if the input signal level is outside the above range.

As discussed above, the present invention provides advantages in that the signal of the defective pixels can be compensated by the signals of the neighbouring pixels, and the yield of elements of a solid state camera is thereby remarkably improved.

While the present invention has been described in detail and with reference to a specific embodiment thereof, it will be apparent to those skilled in the art that various changes and modifications can be made therein without departing from the spirit and scope thereof.

What is claimed is:

1. A solid state imaging device comprising:
   a solid state sensor for converting an external scene into electrical signals;
   an A/D converter for converting output signals transmitted from the solid state sensor into digital signals;
   a frame memory for storing offset signals of the solid state sensor;
   an arithmetic unit for subtracting the offset signals stored in the frame memory from the digital signals of the A/D converter;
   a level detector for judging whether the offset signals stored in the frame memory exceed a predetermined level or not;
   a delay circuit for delaying outputs of the level detector; and
   a spatial processor for effecting interpolation with neighbouring peripheral pixel signals from the solid state sensor through the AD converter after judging a given pixel to be defective when the output of the level detector through the delay circuit is in excess of said predetermined level.

2. A solid state imaging device as set forth in claim 1, wherein said spatial processor consists of multi-connected shift registers and a spatial arithmetic circuit, and the shift registers output signals of said given pixel and said peripheral pixels to the spatial arithmetic circuit in which interpolatory arithmetic is performed.

3. A solid state imaging device as set forth in claim 1, wherein said peripheral pixels are identified as eight pixels disposed in the vicinity of said given pixel.

4. A solid state imaging device as set forth in claim 1, wherein said peripheral pixels are identified as four pixels disposed in the vicinity of said given pixel.

5. A solid state imaging device as set forth in claim 4, wherein said four pixels are disposed in positions above and below and to the right and left of said given pixel.

6. A solid state imaging device as set forth in claim 4, wherein said four pixels are disposed in positions off to the upper right and upper left and off to the lower right and lower left of said given pixel.

7. A solid state imaging device as set forth in claim 3 or 4, wherein the value to be interpolated is the average value of said peripheral pixels.

8. A solid state imaging device as set forth in claim 1, wherein no interpolation is executed when said output of said level detector is smaller than a predetermined level, and said signal of said given pixel is output as it is from said spatial processor.

9. A solid state imaging device as set forth in claim 2, wherein said delay circuit has a delay time equivalent to one picture scanning, and delays said output of said level detector which corresponds to said given pixel till said signals of the given pixel and said peripheral pixels are output from said shift registers.

10. In a solid state imaging device having a solid state sensor and means coupled from said sensor for providing a digital signal including memory means, the improvement comprising, a level detector for sensing a predetermined level of the signal from said memory means, a delay means for delaying outputs from said level detector, and a processor means responsive to said delayed output and said digital signal and having at least two states including a normal state when the original pixel signal is coupled and a substitute state utilizing image signals associated with adjacent pixel signals in a position corresponding to the defective picture elements, said normal and substitute states being demarcated by said level detector predetermined level.

11. In a solid state imaging device as set forth in claim 10 wherein said processor means comprises a spacial processor including a plurality of shift registers and a spacial arithmetic circuit, said shift registers outputting signals of said given pixel and said adjacent pixels to the spatial arithmetic circuit in which interpolatory arithmetic is performed.

12. In a solid state imaging device as set forth in claim 10 wherein said adjacent pixels are identified as 8 pixels disposed in the vicinity of said given pixel.

13. In a solid state imaging device as set forth in claim 10 wherein said adjacent pixels are identified as 4 pixels disposed in the vicinity of said given pixel.

14. In a solid state imaging device as set forth in claim 13 wherein said 4 pixels are disposed in positions above and below and to the right and to the left of said given pixel.

15. In a solid state imaging device as set forth in claim 13 wherein said 4 pixels are disposed in positions off to the upper right and upper left and off to the lower right and lower left of said given pixel.

16. In a solid state imaging device as set forth in claim 14 wherein the value to be interpolated is the average value of said adjacent pixels.

17. In a solid state imaging device as set forth in claim 15 wherein the value to be interpolated is the average value of said adjacent pixels.

18. In a solid state imaging device as set forth in claim 10 wherein said delay circuit has a delay time equivalent to one picture horizontal scanning line, and delays said output of said level detector which corresponds to said given pixel until said signals of said given pixel and said adjacent pixels are outputted.

19. In a solid state imaging device as set forth in claim 10 wherein a given pixel is determined to be defective when the output of the level detector through the delay means is in excess of said predetermined level.

20. A solid state imaging device having a solid state sensor and means coupled from said sensor for providing a digital signal including memory means, the improvement comprising, a level detector for sensing a predetermined level of the signal from said memory means, a delay means for delaying outputs from said level detector, and a processor means responsive to said delayed output and said digital signal and having a substitute state utilizing image signals associated with adjacent pixel signals in a position corresponding to a defective picture element, the state of said level detector as it relates to said predetermined level determining enabling of said substitute state.

21. A solid state imaging device having a solid state sensor and means coupled to said sensor for providing a digital signal including memory means, the improvement comprising, a level detector for sensing whether a signal level from said memory means is within a predetermined range or not, a delay means for delaying outputs from said level detector, and a processor means responsive to said delayed output and said digital signal and having at least two states including a normal state when the original pixel signal is coupled and a substitute state utilizing image signals associated with adjacent pixel signals in a position corresponding to a defective image signal, said normal and substitute states being demarcated by said level detector predetermined range.

22. A solid state imaging device as set forth in claim 21 wherein said processor means comprises a spatial processor including a plurality of shift registers and a spatial arithmetic circuit, said shift registers outputting signals of said given pixel and said adjacent pixels to the spatial arithmetic circuit in which interpolatory arithmetic is performed.

23. A solid state imaging device as set forth in claim 21 wherein said adjacent pixels are identified as 8 pixels disposed in the vicinity of said given pixel.

24. A solid state imaging device as set forth in claim 21 wherein said adjacent pixels are identified as 4 pixels disposed in the vicinity of said given pixel.

25. A solid state imaging device as set forth in claim 24 wherein said 4 pixels are disposed in positions above and below and to the right and left of said given pixel.

26. A solid state imaging device as set forth in claim 24 wherein said 4 pixels are disposed in positions off to the upper right and upper left and off to the lower right and lower left of said given pixel.

27. A solid state imaging device as set forth in claim 23, 24, 25 or 26 wherein the value to be interpolated is the average value of said adjacent pixels.

28. A solid state imaging device as set forth in claim 21 wherein said delay circuit delays said output of said level detector which corresponds to said given pixel until said signals of said given pixel and said adjacent pixels are output.

29. A solid state imaging device as set forth in claim 21 wherein a given pixel is determined to be defective when the output of the level detector through the delay means corresponds to said offset signal level which is outside said predetermined range.

30. A solid state imaging device as set forth in claim 21 wherein said level detector is a digital level comparator.

31. A solid state imaging device as set forth in claim 21 wherein said level detector includes upper and lower level digital comparator and OR gate means.

32. A solid state imaging device as set forth in claim 21 wherein said delay means has shift registers connected in series.

33. A solid state imaging device as set forth in claim 22 wherein said spatial arithmetic circuit has adders, an n-bit shifter and a selector.

* * * * *